US008127290B2

(12) United States Patent
Suit

(10) Patent No.: US 8,127,290 B2
(45) Date of Patent: Feb. 28, 2012

(54) METHOD AND SYSTEM FOR DIRECT INSERTION OF A VIRTUAL MACHINE DRIVER

(75) Inventor: John M. Suit, Mount Airy, MD (US)

(73) Assignee: Red Hat, Inc., Raleigh, NC (US)

( * ) Notice: Subject to any disclaimer, the term of this patent is extended or adjusted under 35 U.S.C. 154(b) by 935 days.

(21) Appl. No.: 11/867,500

(22) Filed: Oct. 4, 2007

(65) Prior Publication Data

US 2008/0320499 A1 Dec. 25, 2008

Related U.S. Application Data

(63) Continuation-in-part of application No. 11/767,173, filed on Jun. 22, 2007.

(51) Int. Cl.
*G06F 9/455* (2006.01)
(52) U.S. Cl. .............................. 718/1; 719/321; 719/327
(58) Field of Classification Search ........ 718/1; 719/321, 719/327
See application file for complete search history.

(56) References Cited

U.S. PATENT DOCUMENTS

| 7,181,769 | B1 | 2/2007 | Keanini et al. |
| 7,356,679 | B1 | 4/2008 | Le et al. |
| 7,600,259 | B2 | 10/2009 | Qi |
| 7,698,545 | B1 | 4/2010 | Campbell et al. |
| 7,761,917 | B1 | 7/2010 | Kumar |
| 7,877,781 | B2 | 1/2011 | Lim |
| 7,886,294 | B2 | 2/2011 | Dostert et al. |
| 2003/0014626 | A1 | 1/2003 | Poeluev et al. |
| 2003/0046586 | A1 | 3/2003 | Bheemarasetti et al. |
| 2003/0101245 | A1 | 5/2003 | Srinivasan et al. |
| 2003/0120935 | A1 | 6/2003 | Teal et al. |
| 2005/0102529 | A1 | 5/2005 | Buddhikot et al. |
| 2005/0125503 | A1 | 6/2005 | Iyengar et al. |
| 2005/0240558 | A1 | 10/2005 | Gil et al. |
| 2005/0289648 | A1 | 12/2005 | Grobman et al. |
| 2006/0037072 | A1 | 2/2006 | Rao et al. |
| 2006/0041885 | A1 | 2/2006 | Broquere et al. |
| 2006/0136720 | A1 | 6/2006 | Armstrong et al. |
| 2006/0156380 | A1 | 7/2006 | Gladstone et al. |
| 2006/0271395 | A1 | 11/2006 | Harris et al. |

(Continued)

FOREIGN PATENT DOCUMENTS

WO    WO 2005050414    6/2005

(Continued)

OTHER PUBLICATIONS

Red Hat Office Action for U.S. Appl. No. 11/767,173, mailed Jul. 6, 2010.

(Continued)

*Primary Examiner* — Andy Ho
(74) *Attorney, Agent, or Firm* — Lowenstein Sandler PC

(57) ABSTRACT

A method and system for a communication network containing both trusted peers and untrusted hosts within the network. Trusted peers can collaborate with each other to observe and monitor the activity of the untrusted hosts. In addition, a trusted peer instantiated with a virtual machine can have an operating system kernel collaborate with a hypervisor to determine whether threats are present. A trusted peer that needs particular functionality installed can collaborate with other trusted peers and with an administrative console to have that functionality installed. An untrusted host can have a driver directly inserted into it by an administration console, which will facilitate in the collaboration process.

24 Claims, 10 Drawing Sheets

U.S. PATENT DOCUMENTS

| | | |
|---|---|---|
| 2007/0011667 A1 | 1/2007 | Subbiah et al. |
| 2007/0043860 A1 | 2/2007 | Pabari |
| 2007/0058551 A1 | 3/2007 | Brusotti et al. |
| 2007/0198656 A1 | 8/2007 | Mazzaferri et al. |
| 2007/0204153 A1 | 8/2007 | Tome et al. |
| 2007/0234412 A1 | 10/2007 | Smith et al. |
| 2007/0261112 A1 | 11/2007 | Todd et al. |
| 2008/0005124 A1 | 1/2008 | Jung et al. |
| 2008/0016570 A1 | 1/2008 | Capalik et al. |
| 2008/0047009 A1 | 2/2008 | Overcash et al. |
| 2008/0056487 A1 | 3/2008 | Akyol et al. |
| 2008/0089338 A1 | 4/2008 | Campbell et al. |
| 2008/0140795 A1 | 6/2008 | He et al. |
| 2008/0184225 A1* | 7/2008 | Fitzgerald et al. ............. 718/1 |
| 2008/0263658 A1 | 10/2008 | Michael et al. |
| 2008/0271025 A1 | 10/2008 | Gross et al. |
| 2008/0288962 A1* | 11/2008 | Greifeneder et al. ......... 719/317 |
| 2008/0320499 A1 | 12/2008 | Suit et al. |
| 2008/0320561 A1 | 12/2008 | Suit et al. |
| 2008/0320583 A1* | 12/2008 | Sharma et al. ................ 726/12 |
| 2008/0320592 A1 | 12/2008 | Suit et al. |
| 2009/0182928 A1 | 7/2009 | Becker et al. |
| 2009/0183173 A1 | 7/2009 | Becker et al. |
| 2009/0210427 A1 | 8/2009 | Eidler et al. |
| 2009/0216816 A1 | 8/2009 | Basler et al. |
| 2009/0254993 A1 | 10/2009 | Leone |
| 2010/0011200 A1 | 1/2010 | Rosenan |
| 2010/0332432 A1 | 12/2010 | Hirsch |

FOREIGN PATENT DOCUMENTS

| | | |
|---|---|---|
| WO | WO 2005101782 | 10/2005 |

OTHER PUBLICATIONS

Red Hat Office Action for U.S. Appl. No. 11/767,173, mailed Dec. 14, 2010.

Red Hat Office Action for U.S. Appl. No. 11/867,456, mailed Aug. 1, 2011.

Red Hat Office Action for U.S. Appl. No. 11/867,456, mailed Feb. 16, 2011.

Red Hat Office Action for U.S. Appl. No. 12/111,110, mailed Mar. 17, 2011.

Red Hat Office Action for U.S. Appl. No. 12/111,110, mailed Aug. 17, 2011.

Red Hat Office Action for U.S. Appl. No. 11/867,500, mailed Dec. 23, 2010.

Red Hat Office Action for U.S. Appl. No. 12/013,304, mailed Apr. 13, 2011.

Red Hat Office Action for U.S. Appl. No. 12/013,314 mailed Jul. 19, 2011.

Hardwood, Aaron, Parallel Virtual Machine, Oct. 22, 2003, pp. 1-5.

* cited by examiner

METHOD AND SYSTEM FOR DIRECT INSERTION OF A VIRTUAL MACHINE DRIVER

BACKGROUND

1. Field

The invention relates generally to virtualization techniques and more specifically the insertion of a driver directly into a virtual machine executable file.

2. Background

Modern enterprise networks are designed and architected for client/server computing, as well as peer to peer communication. A host computing machine may attach itself to a modern enterprise network and establish itself on the enterprise utilizing no more than a non-authenticated physical connection. Specifically, an untrusted host computing machine with physical access to an enterprise network can attach and monitor for "typical" network behavior, as well as specific authentication criteria that could allow a malicious individual(s) to gain access the resources of the given enterprise network. In many cases it is not possible for the physical hardware responsible for both the security and business continuity of the enterprise network to determine which host(s) or peers should or should not be present and accessing network resources.

A computing host that has been classified as "non-authentic" (e.g., a rogue machine, unidentified machine, or a machine that has some type of malicious functionality installed on it) should be removed from the enterprise if possible or, at a minimum, provided with very limited services and access to the enterprise resources. An approach that allows for categorical denial of a "non-authentic" peer to access, impact, or otherwise effect the enterprise network would be useful in such a situation.

A need therefore exists for a software arrangement and process that is capable of allowing trusted entities within a communications network to collaborate with each other to determine whether a particular activity should be permitted or not. In one case, a need exists for allowing trusted nodes within a communications network to collaborate with each other to determine whether an untrusted node may be trusted. In another case, a need exists for allowing trusted components of a virtual machine to collaborate in determining whether communications to or from a given node should be permitted or whether there are security vulnerabilities are being exploited (or attempting to be exploited) on that node. A need further exists for the ability to directly insert a driver into a virtual machine file of either a trusted or untrusted node.

SUMMARY

In accordance with one embodiment of the invention, a software based mechanism allows a driver to be directly inserted into a flat file of a virtual machine. The insertion of the driver can occur when the virtual machine is at rest (i.e., in storage). Alternatively, the driver can be inserted when the virtual machine is executing. According to an embodiment, the driver can be inserted by compressing a known file in the existing virtual machine and inserting the driver in the space freed up by the compression of that known file.

Additionally, in an embodiment a driver can be inserted into a virtual machine by encapsulating a known set of functionality and executing it out of user space instead of kernel space. In another embodiment, a driver can be inserted into an already executing virtual machine.

DETAILED DESCRIPTION

Numerous opportunities may exist within an enterprise for a host computing device (or simply "host device") to connect to an enterprise network. Often, such host devices may connect to the enterprise network in a way that results in a degradation of business continuity, the loss or destruction of intellectual property, or some other negative impact. These negative results could occur as a result of a malicious user purposefully trying to harm the network or as a result of an inadvertent user simply unaware of the damage being caused. Examples of such negative effects include infecting the enterprise network with viruses, Trojans or other malware; being used as a zombie in a distributed denial of service (DDOS) attack; or maliciously causing a DDOS on the infected host and also to other hosts on the network by flooding the network with unauthorized traffic.

One approach for handling the above situation would be to validate untrusted hosts in the enterprise before full enterprise communication and resource allocation is permitted between trusted peers. In this context, a trusted peer is a host device within an enterprise network and an untrusted host comprises a host device that has not been or, for some reason, cannot be fully authenticated. A trusted peer is a host device that has been adequately authenticated to the enterprise. Such authentication may be facilitated by a single trusted peer (in collaboration with the administration console) and also by collaboration between multiple trusted peers to determine peer authenticity and remediation of non-authentic enterprise nodes.

Once a distributed system of collaborating trusted (i.e., authenticated) peers has been established within an enterprise network, those trusted peers can operate in conjunction to determine a classification for another untrusted node. This collaboration requires only that the trusted nodes observe or witness the communication behavior of the untrusted node. Similarly, within a trusted node, collaboration can occur between trusted components at various levels within the computing stack to determine if any security vulnerabilities are being exploited.

Various embodiments of this mechanism and an exemplary process for installing it are described in the following subsections. As indicated, this mechanism could be remotely distributed from a single hardware platform to one or more nodes within an enterprise network. The mechanism could be installed in stages and each stage can be selected with the characteristics of that node in mind. The configuration at any given mode could comprise an observation functionality, an analysis functionality, a reporting functionality, a remediation functionality or some subset of those functionalities.

Figure 1:
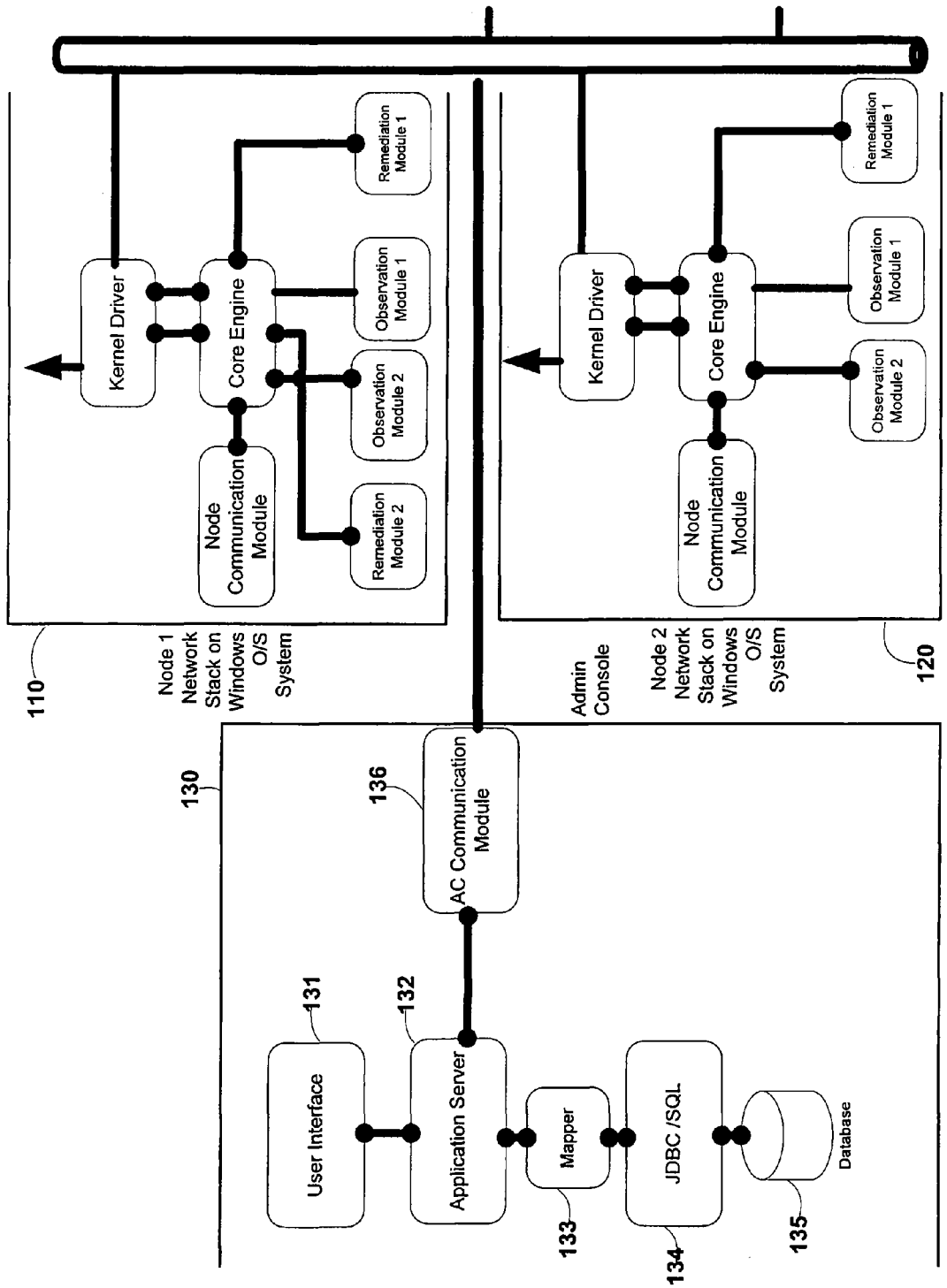
FIG. 1 illustrates an example of a high level component architecture usable in an embodiment of the invention.

FIG. 1 illustrates an example of a high level component architecture usable with an embodiment of the present invention. In this exemplary arrangement there are two network nodes 110 and 120 shown, although the number of network nodes is not intended to be limited to two. Additionally, while the network nodes are shown to be similar, they may be very different without affecting the use of the invention. The network nodes are coupled for data communication flow via a data transmission medium. The transmission medium could be wired, wireless, or some combination thereof and its type is not relevant to practicing the invention. In this embodiment, another computer platform 130 can be in communication with the network nodes via the data transmission medium. In this example, that platform is called an administration console (AC), which will also be a trusted peer to other trusted peers in the network.

In this example, the AC has at least the following components: user interface 131, application server 132, mapper 133, JDBC/SQL 134, database 135 and AC communication module 136. The AC propagates the security mechanism out to the various network nodes via the data transmission medium. It might propagate the mechanism in stages so as to first cause a receiving network node to install the core aspect or core engine of the mechanism when a user of the node logs in. The installation is designed to be transparent to the user and the core engine is hooked into the stack of the operating system of the node. This installation thus yields the disposition of the core engine and stealth kernel driver as shown in each of nodes 110 and 120.

Once the core engine component is installed, the AC may send a communication module component that enables data traffic pertaining to the collaboration mechanism functionality to be conveyed or communicated to and/or from that network node. These components are shown as the node communication modules in each of nodes 110 and 120. Collectively, the core engine, the node communication module, and the additional modules described below comprise a set of functional modules.

Once the node communication module is installed, the AC can forward one or more observation modules to the node. Examples of types of observation modules will be described below. Each such module can be designed to receive data packets intercepted between an adapter driver and a protocol layer of the node's operating system and then analyze the data packets to determine whether they are indicative of some activity or behavior of interest.

In one possible embodiment, the user interface of the AC will present a security dashboard to an operator. The dashboard will facilitate operator actions intended to remotely install, execute, report on and manage the state of the enterprise from a single geographic location.

In addition to illustrating components of interest, FIG. 1 illustrates example packet flows that indicate those packets directed to the security mechanism, packets that are target packets, that is packets of interest to the security mechanism, and flows where the packets are mixed, that is where there are target packets and security mechanism packets. In this example, the packet flow between the highlighted components with AC 130 are directed to the security mechanism, as is the traffic between the core engine and the node communication module within a node. The traffic between the core engine and the observation modules and remediation modules pertains to the target packets. The remainder of the illustrated data packet flows can be considered mixed.

Figure 2:
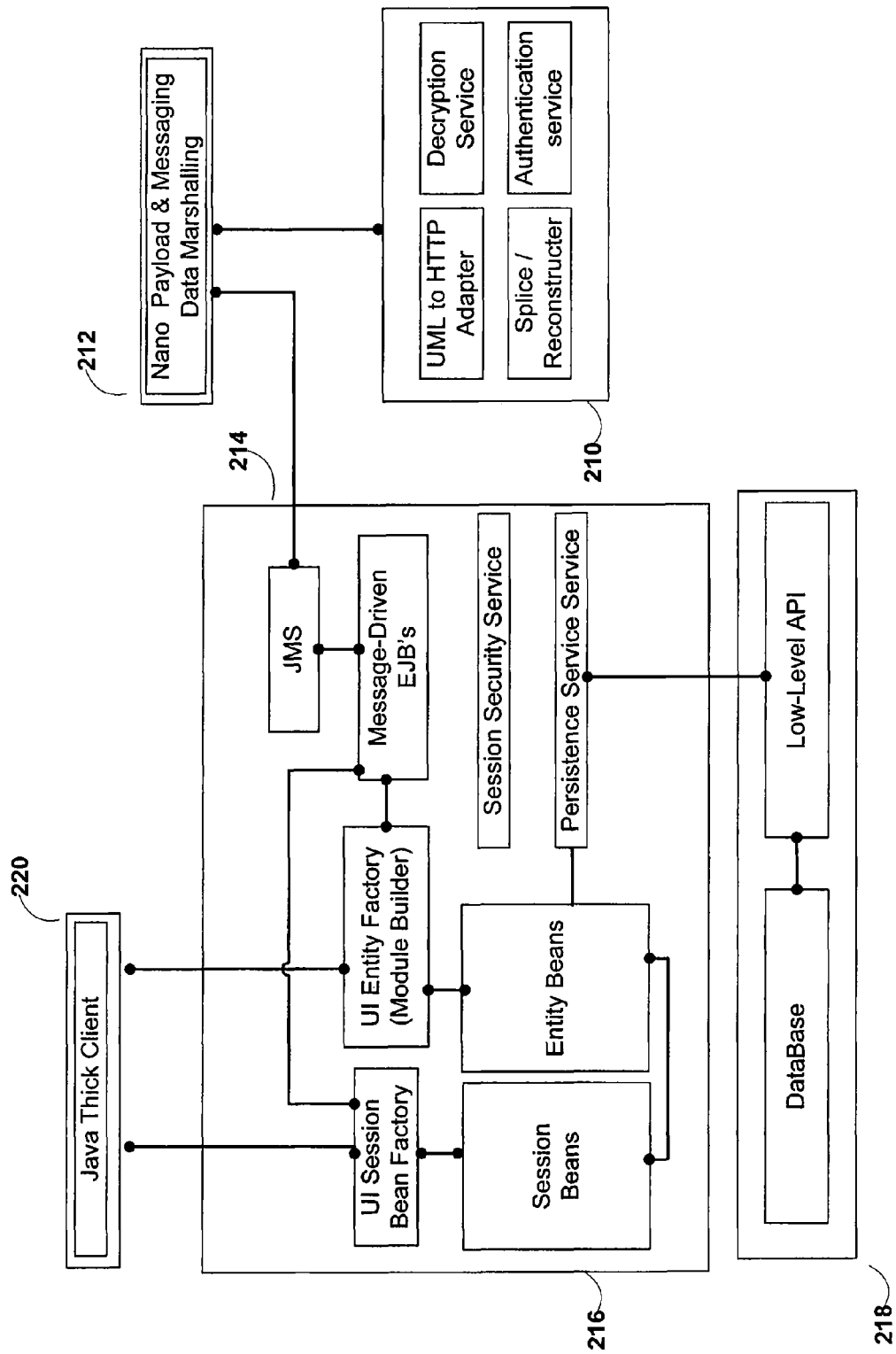
FIG. 2 illustrates an example of a high level component architecture of a central node usable in an embodiment of the invention.

FIG. 2 illustrates an example of a high level component architecture that could be used to implement an administrative console having the features and functionality of that described above in relation to FIG. 1.

In the example of FIG. 2, the AC can include six major components, a communication package 210, an object adapter 212, an EJB Servlet container 214, a J2EE Application Container 216, a data store 218, and thick client 220.

In one example configuration, data store 218 can include a relational database to store all persistent data pertaining to the security mechanism. This data can include, but is not limited to, system configuration information, system state information, activity reports from node modules such as from a communication module, an observation module or remediation module. The database could additionally store module activity event configuration, network topology data, node inventory data, operator credentials, and operator activity log data. Thus, the AC can monitor, track and act on information detected and/or collected by the security mechanism at the respective nodes. As a consequence, an operator or system monitor can prescribe further security-related activities to the network via the various network nodes. Also, because the AC can see the reports of multiple nodes, it can detect security attacks that might not be detectable by a single network node operating on its own.

Figure 3:
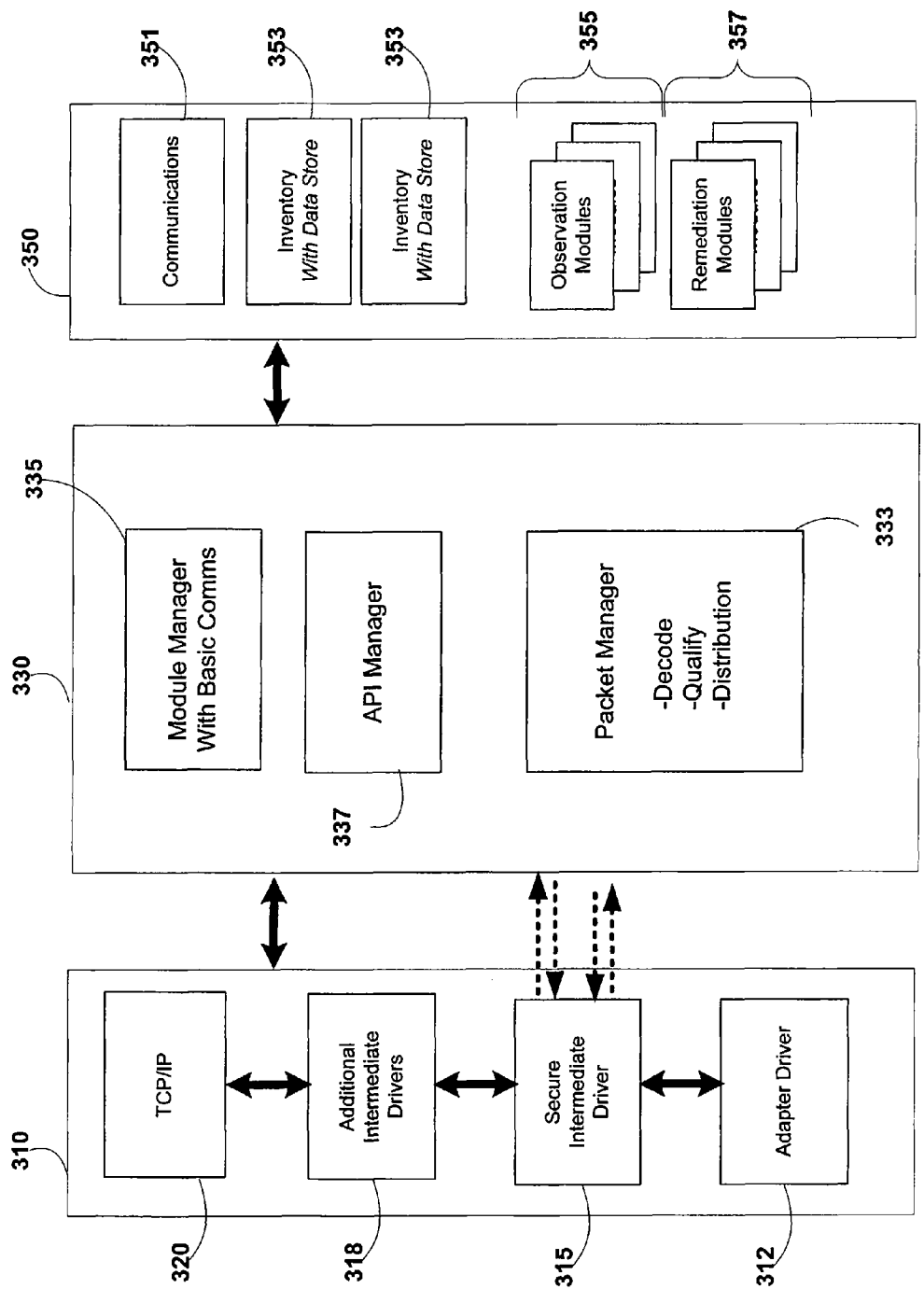
FIG. 3 illustrates an example of a high level component architecture of an installed detection arrangement usable in connection with the arrangement of FIG. 1.

FIG. 3 illustrates an example of a high level component architecture which could be used in the arrangement of FIG. 1. This exemplary illustration shows three major components of the network node, the network stack 310, a core engine 330, and a modules component 350. In accordance with this embodiment, a secure intermediate driver (SID) 315 is installed in the network stack, at the bottom of that stack, adjacent to adapter driver 312. As illustrated the network stack might also include additional intermediate drivers 318 between the SID 315 and the protocol layer, here TCP/IP 320. The SID 315 is one example of a packet driver that can intercept data packets from the network stack for processing by the remainder of the security mechanism. Specifically, once a packet is intercepted, it can be provided to the core engine (CE) which as shown in FIG. 3 can include a module manager 335, an API manager 337 and a packet manager 333. The CE will decode, qualify and route packets to any module which needs to process the packet. The CE can even be dynamically updated at run time.

The modules for observation and/or remediation are associated with the module component 350. In this example, the module component includes communications capabilities 351, inventory data stores 353, one or more observation modules 355 and one or more remediation modules 357. These observation and remediation modules are intended to handle the details of the packet processing operations. The modules also can be dynamically updated.

The above-described architecture is designed to include multiple strategies for packet drivers. An appropriate packet driver for a particular customer or node will depend on customer requirements. While the specifics may vary, it is beneficial if a packet driver has one or more of the following characteristics:

1. it intercepts packets as close to the adapter driver as possible;
2. it allows the packet driver to be re-installed if disabled by user control;
3. it detects whether the connection to the adapter driver is hooked/intercepted/tampered with in any way; and
4. persists in the core engine in non-volatile memory and load and execute the Core Engine.

Additionally, the Secure Intermediate Driver described above can be designed so that, for example in a Microsoft operating system environment, it will effectively look like an adapter driver to the protocols and a protocol to the adaptive driver. The SID can then forward all of the packets to the CE and it can effectively forward all packets between the protocols and the adapter driver transparently if desired.

Figure 4:
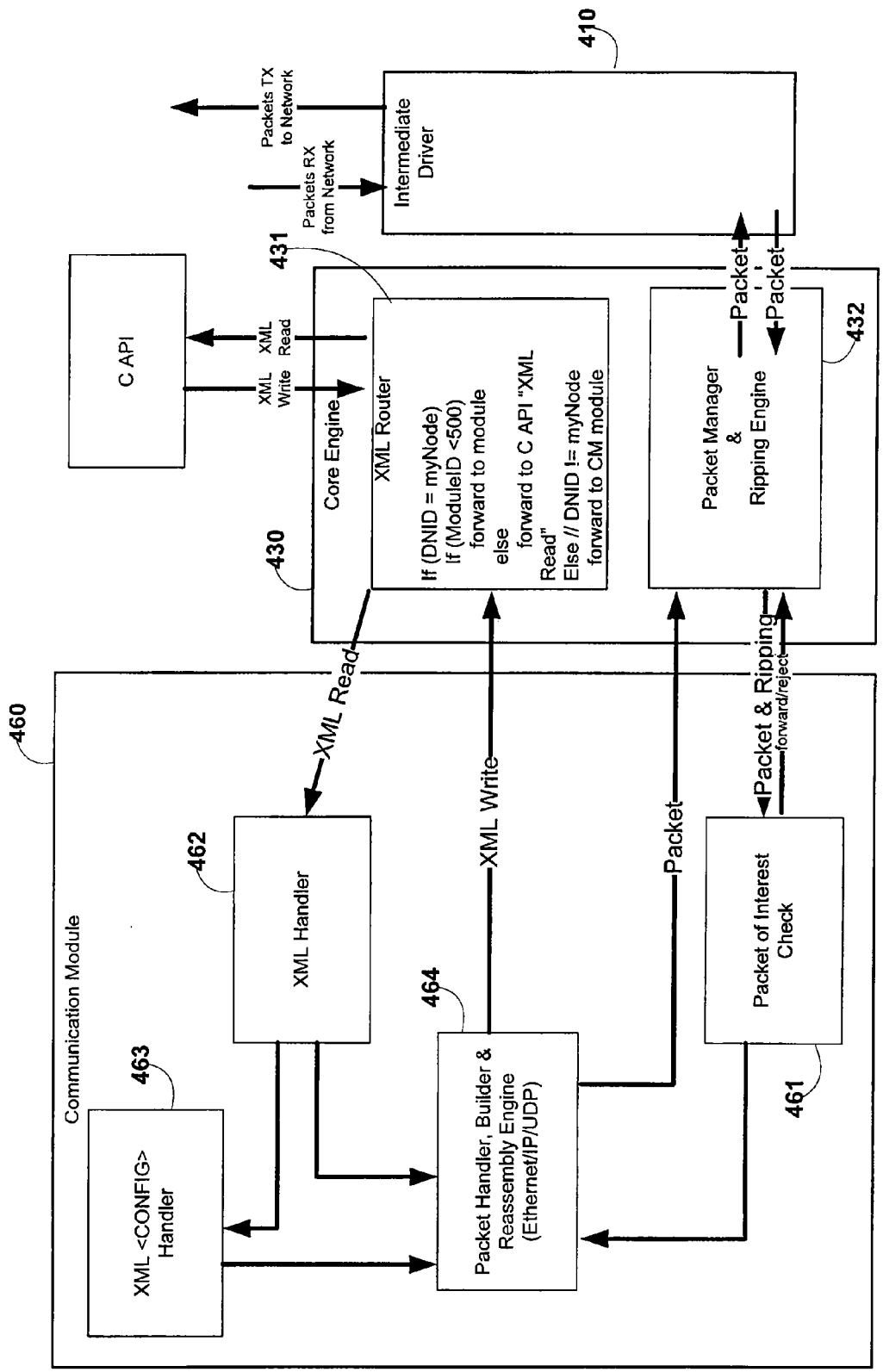
FIG. 4 illustrates another high level view of an installed detection arrangement along with exemplary packet flows.

FIG. 4 provides another component level diagram of an aspect of the security mechanism that can be installed in a node such as in FIG. 1. In this illustration additional features of the Core Engine are illustrated and aspects of a communication module, such as element 460 in FIG. 1 are shown in detail.

In FIG. 4 an intermediate driver 410 receives packets from the network and transmits packets to the network. This could be the SID described above. The intermediate driver intercepts packets from this flow and provides them to the CE 430. In this illustration two aspects of the CE are referred to, XML router 431 and Packet Manager and Ripping Engine 432. The intermediate driver exchanges packets with Packet Manager and Ripping Engine 432. As will be described in connection with FIG. 5, the Core Engine will forward packets to/from the drivers to any module that is registered to receive that traffic. In this illustration, however, the focus is on communications, particularly between this instantiation of the security mechanism and another instantiation of the mechanism at another node or with the Administrative Console.

In the arrangement of FIG. 4, the XML Router interacts with C-API, a device that has a read/write interface that enables the AC to communicate with elements of the security mechanism. Furthermore, the XML Router and the Packet Manager and Ripping Engine interface with communication module 460. The Packet Manager and Ripping Engine sends an intercepted packet to the Packet of Interest Check 461. If the packet is of interest it is queried for processing by the Packet Handler, Builder and Reassembly Engine 464 which is responsive to XML Handler 462 and XML Handler 463. The result is that the communications module will take any XML message destined for another security mechanism and package that message into an Ethernet message. The Ethernet message is sent back to the Packet Manager in the CE and is forwarded to the Intermediate Driver for transmission on the network.

Figure 5:
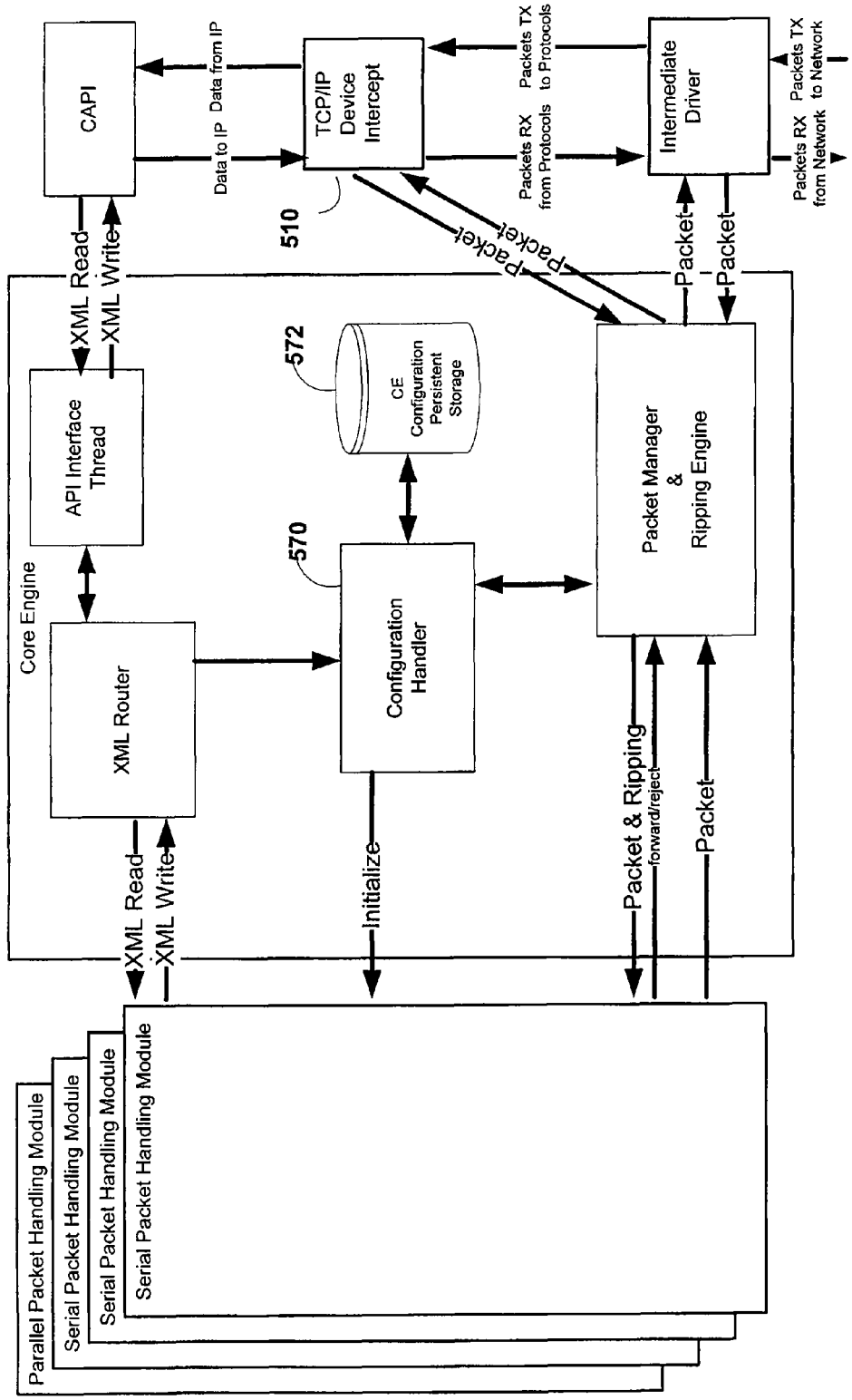
FIG. 5 illustrates an example of a component level arrangement usable in a configuration such as FIG. 4.

FIG. 5 provides another component level view of aspects of the Core Engine. In this illustration, the Core Engine is shown interfacing with the C API and the intermediate driver as in FIG. 4. However, this illustration shows the CE interacting with one or more modules and with a TCP/IP Device Intercept. Also, this arrangement shows more aspects of the CE.

In this arrangement, the CE's Packet Manager and Ripping Engine exchanges packets with the intermediate driver, as above, and with the TCP/IP device intercept 510. The Packet Manager and Ripping Engine further exchanges packets with various handling modules as appropriate.

Within the CE, the API interface thread handles the read/write interface from the CAPI as described above with respect to FIG. 4. The XML Router performs the same functions as in FIG. 4 but is now shown to interface more specifically with a configuration handler 570 that has associated CE Configuration persistent storage 572. The Configuration Handler is a thread that will process all CE <CONFIG> messages and will persist the current configuration so it can be retrieved on any re-start. This might even include information about any of the modules that have been installed in the system.

Figure 6:
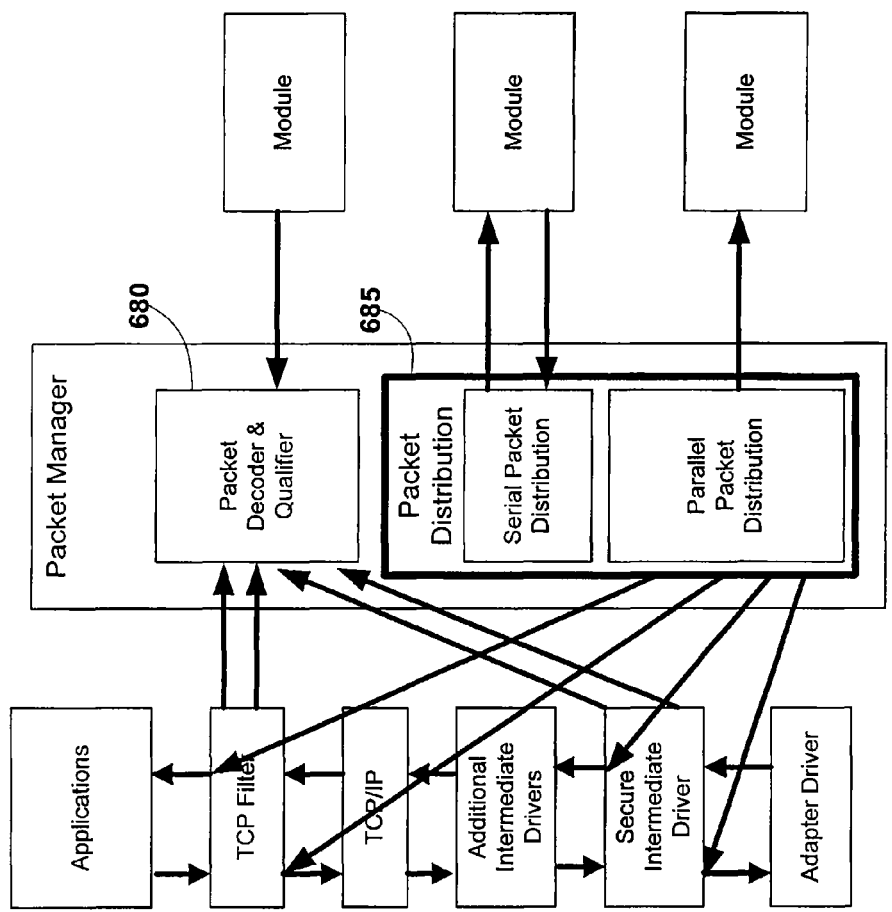
FIG. 6 illustrates an overview of an example of a packet manager usable in a configuration such as that illustrated in FIG. 4.

FIG. 6 provides an illustration of an example of an arrangement of a packet manager (PDM) that could be used in the configurations above, along with items with which the Packet Manager can interact. In the overview shown in FIG. 6, the Packet Manager can include a Packet Decoder and Qualifier 680 as well as a Packet Distribution element 685 that can adapt to either serial distribution of packets (sending the packet to a first module and when processing is complete sending it to a second module) or a parallel distribution of packets (sending a packet to multiple modules in parallel).

As illustrated in FIG. 6, the Packet Decoder can receive packets from the secure intermediate driver and/or a TCP filter. The TCP filter could be a TCP/UDP/Raw filter used to intercept packets/data to and from the TCP/IP device, the UDP device and the Raw device. This will allow a module to receive traffic before it reaches the TCP/IP stack from an application. As in prior descriptions, the Secure Intermediate Driver will be used to intercept packets from any protocol device or any additional intermediate drivers that are installed in the stack, and from the Adaptive Driver.

The PDM will get packets from each connection to the TCP/IP device. In the case where there are multiple TCP/IP addresses the PDM could identify each connection with a unique identifier. This connection identifier will have correlating information stored in an Inventory Module which is described below. The PDM will also get packets from each adapter driver that is currently installed in the system. The PDM will also identify each packet stream to/from the adapter driver with a unique identifier.

The PDM allows modules to request packets/data from each potential source. The PDM has two specific request types; the first is a serial "forward" of the packets and the second is to forward the packet information in parallel with a "smart pointer". Modules that request a serial "forward" of the packets/data will have the potential of modifying the data before the data is forwarded onto the next module or the egress of the PDM. The PDM will allow the modules to specifically ask for traffic from a specific point in the network stack (i.e., egress down from a specific TCP/IP device connection, or ingress up from the adapter driver), or from a specific direction to/from all connections in the network stack (i.e. ingress up from all adapter drivers).

The PDM will perform packet decodes (as much as possible) on all packets/data received by the PDM. The PDM will allow modules to ask for packets/data based on decoded packet/data information.

The following is a list of features that the PDM could be configured to handle:

1. The PDM will obtain traffic flows to/from the Adapter Driver with a connection that is as close to the Adapter Driver as possible.
2. The PDM will obtain traffic flows to/from the TCP/UDP/Raw filter with a connection that is as close to the Applications as possible.
3. The PDM will allow modules to register for serial packet/data forwards based on a specific location and unique device, based on a specific location for all devices, or based on a decoded packet filter.

4. The PDM will allow the modules to modify the serial packet/data traffic and will forward the modified data.

5. The PDM will allow modules to register for parallel packet/data traffic. The PDM will distribute this information using "smart pointers". Modules are not allowed to modify packet/data traffic received with a parallel packet registration.

6. The PDM will allow modules to register for parallel packet decodes information to be sent to the module. The PDM will distribute the packet decodes information using smart pointers.

7. The PDM will allow modules to specify the priority of the filter for serial packet forwarding, parallel packet forwarding, and parallel packet decode forwarding for packets/data received at any specific location. The priority of the filter will determine what order packets will be forwarded to a module. A module may specify a different priority for packets received at different points. For example a module may specify a high priority for packets received on the ingress from the adapter drivers so that it sees packets before any other modules for traffic on the way in, and specify a low priority for packets received on the ingress from the protocol drivers so that it sees packets last after any other modules for traffic on the way out.

8. The PDM will allow modules to "kill" packets/data so that the data is no longer forwarded. This will allow a remediation module to block all packets to/from devices as required.

9. The PDM will allow modules to generate new packets/data to/from any connection point.

As illustrated in many of the drawing figures and as discussed above, the security mechanism can be deployed within a node with one or more modules such as observation modules and remediation modules.

Modules could have a variety of functionality. Some modules could gather computer inventory, some modules could gather network topology, some modules could perform behavior analysis on the network traffic, and some modules could remediate network traffic. All modules in the system must be designed against a set of generic requirements for modules. The generic requirements are as follows:

1. Modules will be installed by the Core Engine and be coded to operate in kernel space or user space.

2. Modules should be able to be uninstalled on demand at run-time.
   a. When a module is asked to uninstall it should clean up all resources, and then inform the CE that it is ready to be uninstalled.

3. Modules should have the ability to persist information.
   a. Modules can temporarily ask the CE to persist some memory. This should be used when a module is being upgraded but information needs to be passed between the old and new module. In this case the CE will be passed a block of information that will be kept in memory.
   b. The modules will use a set of library functions to persist information to the hard drive or other persistent memory in the system. These library functions will encrypt the data, and obfuscate the data to avoid disseminating information to the modules.

As indicated above, the communications module will be used by all other modules to communicate with the Administration Console. The communications module may have multiple modes of communication that it can use, including:

1. Ethernet Broadcast packets—These broadcast packets will not use IP, and therefore will not be routable. However, other nodes which see these messages may route them to/from the AC.

2. UDP packets—This will be a standard UDP packet stream to the AC.

3. Spliced UDP packets—This will be standard UDP packet streams sent in different splices routed via other nodes to the AC.

4. Covert communications—this will use normal IP traffic streams and embed covert communications in to the stream so that communications can not be easily traced.

5. Covert spliced communications—this will use normal IP traffic streams, and may splice the traffic via different channels to reach the AC. The spliced traffic may be routed via other nodes to the AC.

The following features may be desirable for the CM:

1. Receive, authenticate, validate, and decrypt all messages from the AC. Encrypt, create a message integrity check, sign, and send all messages to the AC.

2. Receive all module creation messages, and when a module is complete authenticate, validate, and decrypt the module. Send the module to the module manager for installation.

3. Route all messages received to the proper module or modules.

4. Handle multiple priority messages from various modules and send those messages in the order required based on priority. The CM should be able to stop sending a lower priority message that has been partially sent in order to send a higher priority message. The CM should resume sending the lower priority message when possible, with out retransmitting the entire message.

Other potential modules that might, be used include an Inventory Module (IM), a Discovery Module (DM), Remediation Modules (RM) and Observation Modules (OM).

The IM could be used by all other modules to get inventory information about the computer. The IM could track information like the following:

1. What network cards are installed in the system, and will generate a unique identifier for traffic to/from the network card. The IM will attempt to determine the type of network card; including, wireless, Ethernet, GigE card, and etc. Will determine if Microsoft VPN services are configured on the system.

2. What protocols are installed in the system, and will generate a unique identifier for the traffic to/from the protocol.

3. The software packages that are installed on the system.

4. Will attempt to determine if VPN software is installed on the system. Will specifically look for an intermediate driver from DNE and PCAUSA.

5. Will attempt to determine if a packet sniffer is installed on the system; i.e., Sniffer Pro, Etherpeek, and Ethereal. Will determine if winpcap is installed on the system.

The DM could be used by all other modules to get discovered network information. The DM could maintain information like the following:

1. The MAC addresses of any computer that has been seen on the network.

2. The IP or other network address for any MAC address seen on the network.

3. Duplicate IP addresses will be managed.

4. Multiple IP addresses from a MAC address will be managed.

5. The NNE status of computers seen on the network.

6. The packet counts and octet counts for data sent between computers seen on this network.

RMs could perform remediation against network traffic flows. These may be flows detected by Observation Modules (OMs) that are originating from malware, flows blocked by AC configuration, or other network traffic flows identified by any Observation Module (OM). Remediation may be blocking the traffic flow, resetting the traffic flow, or spoofing that the traffic flow is proceeding while blocking the flow (i.e., like a honey pot).

Initially the RMs will be "dormant" and not have any packet filters registered. They will register their APIs to the API Manager in the CE. If an RM receives a configuration message from the AC or an OM to filter a specific network traffic stream, then it will use the API manager to get the Packet Manager API, and register a serial packet filter for the traffic stream. When that packet stream is delivered to the RM, then it can perform remediation.

Typically, the RM will be required to perform the following:

1. Receive remediation requests from the AC or OMs.
2. Use the IM to determine the appropriate packet filters to use to remediate the request.
3. Register with the Packet Manager for the appropriate serial packet filters.
4. Remediate the traffic received from the Packet Manager.

OMs could perform behavior analysis on the various network packet flows received by the security mechanism. There will be different type of OMs that will look for different network behaviors. The OMs will use the other modules in the system to perform the behavior analysis.

The OMs will be required to perform the following:

1. Use the IM to determine the appropriate packet filters to use for the OM to operate properly.
2. Register with the Packet Manager for the appropriate serial or parallel packet filters.
3. If required, use the DM to get network topology information.
4. When required issue alarm information via the CM to the AC.
5. When requested issue status information via the CM to the AC.
6. If required, receive configuration information and persist that configuration information.
7. When required issue requests to the RM to provide remediation.

Figure 7:
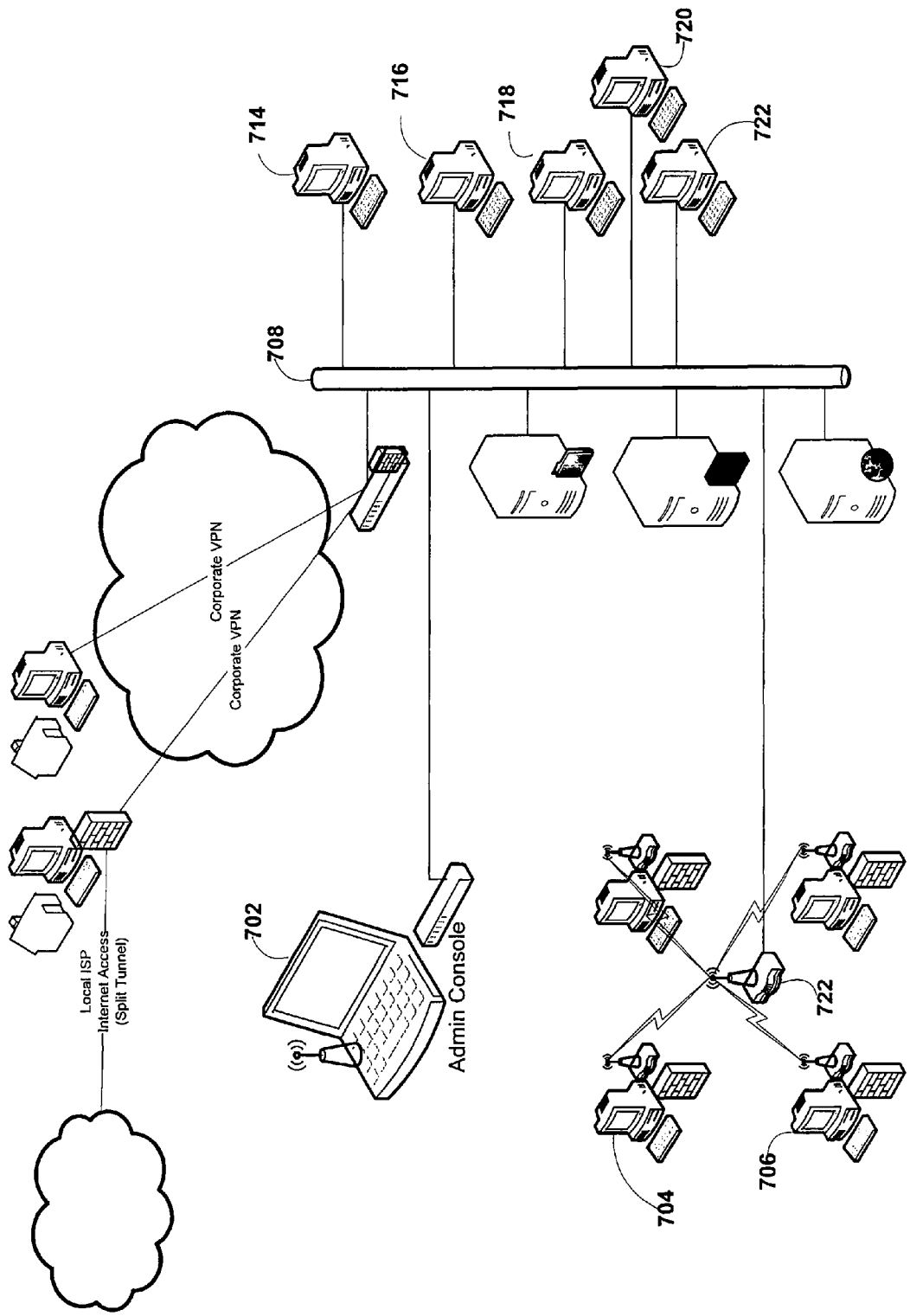
FIG. 7 illustrates an example of a collaboration mechanism allowing collaboration between network nodes.

FIG. 7 is a network diagram of an aspect of the collaboration mechanism that can be installed on one or more nodes in the system. This diagram depicts an administrative console 702, several authenticated and trusted peers and four unauthenticated (and therefore untrusted) hosts. In an embodiment, each trusted peer contains a core engine and one or more modules, as described above. In particular, each trusted peer can contain a collaboration module. The use of a collaboration module allows for one or more trusted peers to be configured with a collaboration mechanism that defines the capability and access permissions of that peer within the confines of the virtual and physical domains in which that trusted peer resides. For example, a trusted peer may be provided the ability to access specific data stores that would be unavailable to untrusted hosts. Collaboration by trusted peers can further lead to the prevention of unauthorized (a) tampering, (b) enterprise network resource usage, (c) disruption in business continuity, and (d) spoofing of trusted peers.

Determining whether an untrusted host can be acceptable to trusted peers and have access to enterprise resources can occur by allowing multiple trusted peers to collaborate with each other to identify and classify the state of the unknown or untrusted host being observed. Referring to the exemplary system shown in FIG. 7, a trusted peer 704 and another trusted peer 706 can be connected to local area network 708 via wireless access point 710. In an embodiment, each trusted peer 704 and 706 in the wireless network can contain the collaboration module described above. If an untrusted host 712 connects to access point 710, trusted peers 704 and 706 can collaborate with each other, the administrative console 702 and, possibly, other trusted nodes connected to local area network 708 in observing the behavior of untrusted host 712. Based on the observation, identification, and classification of the activities of untrusted host 712 by the trusted nodes, untrusted host 712 could become trusted.

In a similar fashion, untrusted host 714 can be physically connected to local area network 708. Trusted peers 716, 718, 720, and 722, each containing a collaboration module as described above, can collaborate on the observation, identification, and classification of the activities of untrusted host 714. This can be accomplished by trusted nodes sharing information they observe from the unknown host's communications with enterprise networks resources as well as the trusted peers themselves. Eventually, that collaboration could lead to untrusted host 714 becoming trusted. Alternatively, untrusted host 714 could exhibit questionable behavior or could violate policy. In such a case, the rest of the trusted nodes on network 708 could contribute to preventing access by untrusted host 714 to network resources.

Any number of behaviors by or characteristics of an untrusted node could be observed by the trusted hosts. Enterprise network communications between both trusted peers and untrusted hosts could be observed or monitored for behavior that could be used to determine the risk associated with continuing a networked relationship with any given trusted peer or untrusted host, regardless of it's classification. Such a list of behaviors could be provided to the trusted peers by a user, developed through a self-learning process, or some combination of the two.

As an example, trusted peers 716, 718, 720, and 722 in FIG. 7 could observe and monitor untrusted host 714 for attempting such things as DNS cache poisoning, IP mapping modifications, phishing, and resource access polling, and then communicate such information amongst all trusted peers (including the administration module). DNS cache poisoning refers to an attack that causes a Domain Name Server (DNS) to appear to have received accurate DNS information. The attack exploits a flaw in the DNS software that can make it accept incorrect information that can then leads to legitimate DNS requests being directed to IP addresses of rogue servers that could potentially contain malicious content. IP mapping modifications involve an attacker attempting to divert traffic by modifying the IP address of a machine (which can be handled within the system described herein via DNS name to IP mapping verification). Phishing refers to an email-based attack, which attempts to gain personal information by convincing the recipient to share personal information with the sender who is usually masquerading as a different entity (e.g., a bank or other financial institution). Resource access polling describes the activity of an attacker trying to access information without authorized access (e.g., searching for social security numbers in databases on the system).

Since each of the above attacks is network based, the trusted peers could collaborate in their observation and remediation of the untrusted host. In a virtual environment, if the untrusted node existed on a physical machine that was a trusted peer, the attacks could be observed there as well by the collaboration between the driver in the hypervisor and the device driver in the operating system (as discussed further in the context of FIG. 8).

Also as a result of the above described distributed approach, if one or more trusted peers require a module that is temporarily unavailable from Administration Console 702, a trusted peer may request or be pushed a module or set of modules and updated configuration from the other trusted peers. For example, in the event that trusted peer 720 did not have one or more particular remediation modules as described above in the context of FIG. 1, those modules could be requested from trusted peers 716, 718, and 722. Alternatively, if trusted peers 716, 718, and 722 detected that trusted peer 720 did not have those remediation modules (without being requested by trusted host 720), trusted peers 716, 718, and 722 could push those remediation modules to trusted host 720.

With the observation and determination of "authenticated" peers that exhibit one or many of these behaviors, a system according to the present invention can allow for the denial of access to network resources by the untrusted host. To do this, one or more trusted peers can ignore the communication attempts by an untrusted host. This methodology can also prevent an untrusted host from introducing unauthorized traffic into an intranet or over the Internet. Further, behavior by neighboring hosts and other network elements (like routers, switches, firewalls, etc) can be enforced per policies supplied, for example, by the network administrator.

Figure 8:
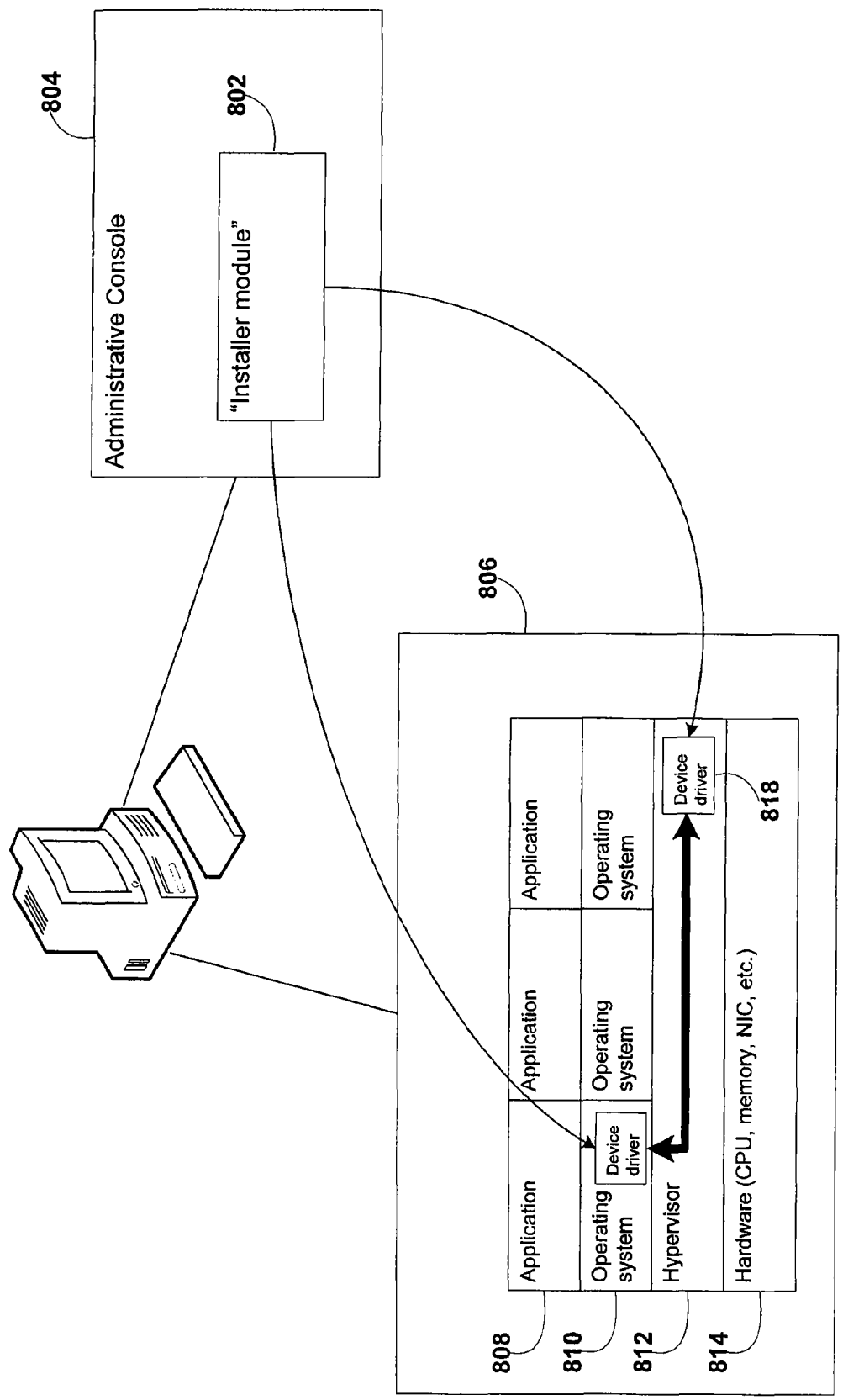
FIG. 8 illustrates an example of an arrangement usable in a configuration such as that illustrated in FIG. 7.

Similarly, access by an untrusted host can be remediated in a virtualized environment. In such a case, access by the untrusted host to the network could be restricted or completely prevented by a driver running on the associated hypervisor (as illustrated in the context of FIG. 8). This could occur, for example, where an untrusted host is determined to be, and thus classified as, a "rogue." In such an instance, that rogue host's network communications can be filtered by all trusted peers. The rogue host could effectively be removed from the enterprise, including, for example, by terminating the process on the physical machine on which it resides or (in a virtualized environment) by having the other trusted peers ignore the untrusted host's virtual machine. This could result from a configuration change dynamically sent to the trusted peers by administration console 702.

Using collaboration in the virtualized environment (as illustrated further in the context of FIG. 8), it is possible to determine if a kernel driver or other malicious code has been maliciously inserted. This could occur, for example, where malicious code is inserted inline, between the operating system driver and the physical kernel driver (i.e., in the hypervisor). Such a case could be observed and analyzed by the two drivers collaborating with each other in analyzing the differences between what was requested or inserted into the stack, and what was yielded or realized at the driver placed directly above the adapter driver of the physical machine.

For cases where trusted peers determine and classify a formally untrusted host's state as safe (or trusted), a message can be sent to administration console 702 to insert the core engine described above to the newly classified peer, along with other modules appropriate for that trusted peer. Having been authenticated, the now trusted peer will also be instantiated with a collaboration module to assist in future analysis of untrusted hosts that connect to the network. The insertion of the collaboration module in the now trusted peer could, further, be accomplished without needing to restart the trusted peer.

FIG. 8 depicts an installer module 802 within an administrative console 804 that can be used for installing a collaboration module (in the form of a device driver) in a virtual machine 806. Virtual machine 806 contains applications 808, operating systems 810, hypervisor 812 and hardware 814. Administrative console 804 can receive information from other trusted peers and cause installer module 802 to install a device driver 816 in the operating system kernel 810 of a virtual machine and a driver 818 onto the hypervisor of the physical machine.

Once installed, device driver 816 in the operating system kernel and hypervisor driver 818 can collaborate with each other and with other trusted peers to observe activity by other untrusted hosts. For example, device driver 816 and driver 818 could determine if an untrusted host has installed a rootkit by collaborating and comparing activity that was intended by the application and what services were actually requested to the hypervisor 812 of the physical machine.

Figure 9:
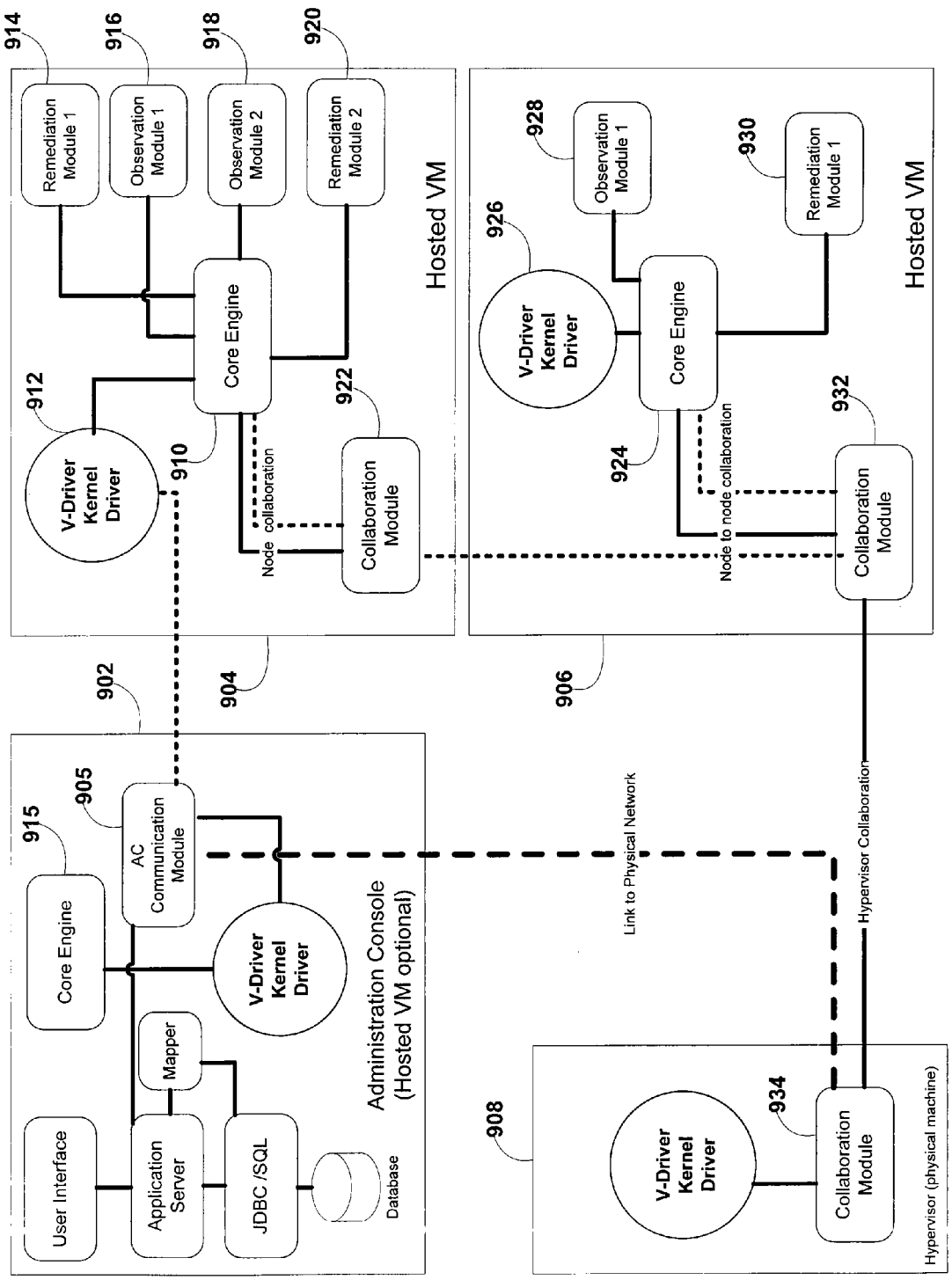
FIG. 9 illustrates an example of an arrangement of modules that can be used for collaboration amongst trusted peers in a network.

FIG. 9 provides a component level network diagram of another aspect of the collaboration mechanism that can be installed in a trusted peer. In this illustration, hosted virtual machine 904 and 906 can each be installed on a trusted peer within the network. Administration console 902 can collaborate over the network (not shown) with hosted virtual machine 904, hosted virtual machine 906, and hypervisor 908. Administration console 902 contains AC communications module 905 that can be used for exchanging information with the various elements in the network, including V-Driver Kernel Driver 912 within hosted virtual machine 904 and collaboration module 934 within hypervisor 908.

Similarly, hosted virtual machine 904 can collaborate with hosted virtual machine 906. In an embodiment, collaboration module 922 within hosted virtual machine 904 can communicate over the network with collaboration module 932 within hosted virtual machine 906. As described above with respect to FIG. 7, the two hosted virtual machines 904 and 906 can collaborate on the observation, identification, and classification of the activities of other trusted peers and untrusted hosts in the network. This can be accomplished by trusted nodes sharing information they observe from the unknown host's communications with enterprise networks resources as well as the "authenticated nodes themselves.

Within hosted virtual machine 904, collaboration module 922 can also perform observation and analysis on activities that lie only within hosted virtual machine 904. For example, collaboration module 922 can observe the integrity and authenticity of the code that makes up all of hosted virtual machine 904 by utilizing an electronic signature. In an embodiment, collaboration module 922 can generate a cryptographic digital signature across various portions of the executable code that make up hosted virtual machine 904. The digital signatures could then be checked at various times during the operation of hosted virtual machine 904 to verify that no changes had been made to any of the code (e.g., by a malicious or rogue entity within the network).

In an embodiment, a digital signature refers to a public key digital signature (or simply digital signature), which can; be calculated across any data object using well understood cryptographic techniques. A digital signature derives its security from the concept of a key pair, consisting of a public key and private key that have a specific mathematical relationship between them. Within a public key infrastructure (PKI), a key pair can be provided to each entity or machine that is to generate digital signatures. In a PKI, the public key can be shared publicly without jeopardizing the overall security of the system.

More specifically, the mathematical relationship between the public key and the private key that comprise the key pair permits the public key to be revealed while maintaining the security of the overall system. This characteristic is particularly important in an open network system such as the Internet where entities need a reliable means of authentication. The private key, on the other hand, must be securely maintained in order for the security of the system to be maintained.

A public key pair used to produce a public key digital signature further has the property of computational infeasibility; i.e., it would be computationally infeasible for an entity to determine the private key of a user from the public key of that user. Thus, the user may share the public key of the user's key pair through a mechanism known as a digital certificate (or simply a "certificate"). In addition to the public key, a certificate may contain a number of other fields that contain information about the holder of the certificate. The well understood X.509 standard, ITU recommendation ITU-T X.509, defines a certificate format commonly used for Internet communications.

In the system shown in FIG. 9, collaboration module 922 would securely maintain the private key (e.g., encrypted in nonvolatile memory). When needed, collaboration module 922 could use a private key to calculate a digital signature on the code that comprises V-Driver Kernel Driver 912, core engine 910, remediation module A 914, observation module A 916, observation module B 918, remediation module B 920, and collaboration module 922. The resulting digital signature and the public key that corresponds to the private key could then be used by collaboration module 922 to check the integrity of the code that makes up hosted virtual machine 904.

FIG. 9 also depicts hosted virtual machines 904 and 906 having different modules installed. In the trusted peer that contains hosted virtual machine 904, core engine 910 can exchange information with remediation module A 914, observation module A 916, observation module B 918, and remediation module B 920 (as described above with respect to FIG. 1). In contrast, the trusted peer that contains hosted virtual machine 906 only contains observation module A 928 and remediation module A 930. In an embodiment involving the collaborative capabilities described above, collaboration module 932 can indicate its need for an observation module B and a remediation module B since it does not have those installed. In the event that those modules were unavailable from administration console 902, collaboration module 932 could collaborate with collaboration module 922 to receive and install an observation module B and a remediation module B.

Figure 10:
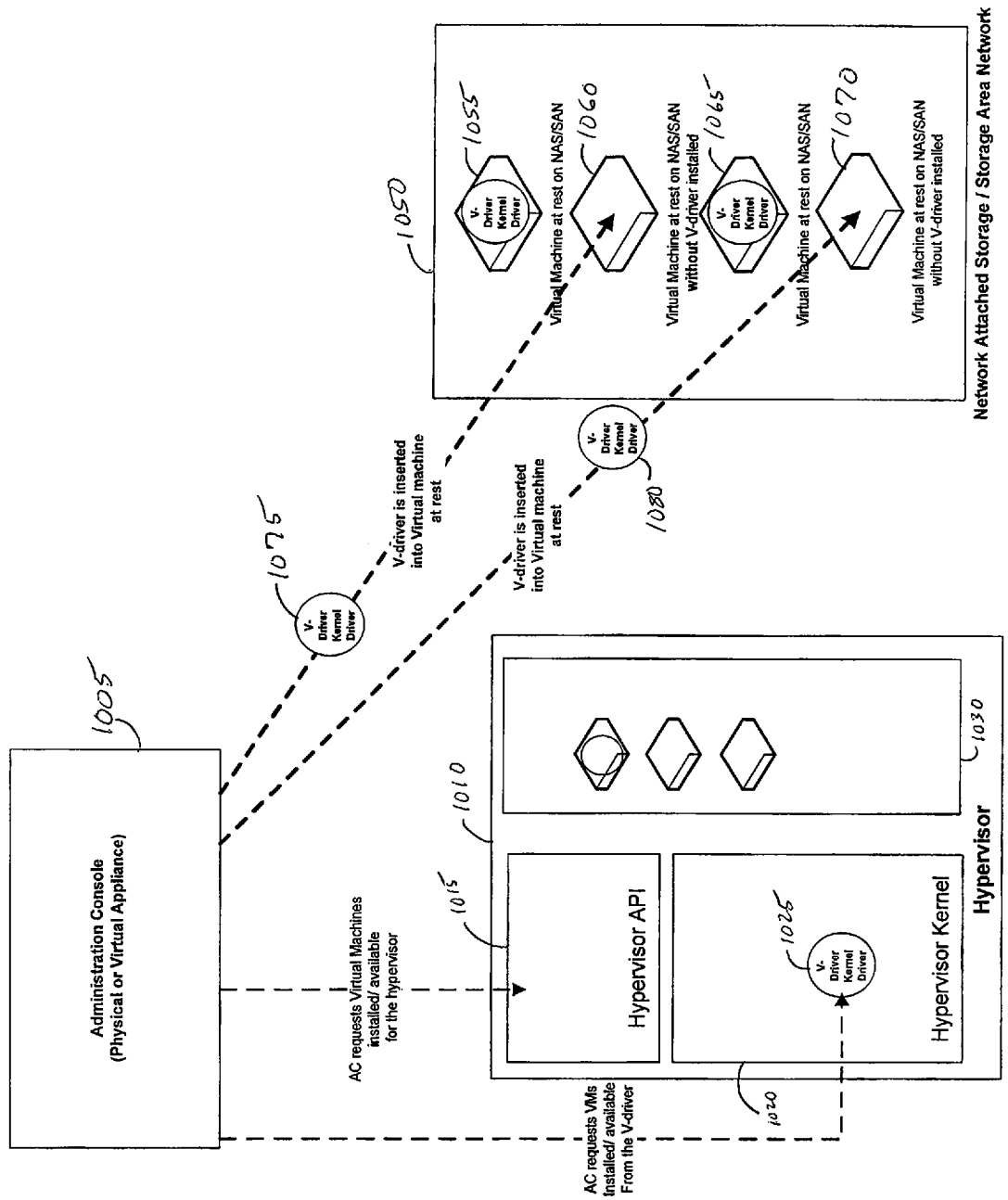
FIG. 10 illustrates an example of a process for direct insertion of a kernel level driver into a virtual machine.

FIG. 10 is a block diagram that depicts several exemplary possible methods for directly inserting a kernel level driver into a virtual machine. As shown in FIG. 10, an administration console 1005 can communicate with a hypervisor 1010, which can contain a hypervisor application programming interface (API) 1015, a hypervisor kernel 1020, and local storage 1030. Administration Console 1005 can also communicate with network storage 1050 (which can comprise general network attached storage devices or a storage area network). Network storage 1050 can further contain various virtual machines 1055, 1060, 1065, and 1070.

Administration console 1005 can identify or qualify which virtual machines in network storage 1050 contain specific software. In an embodiment, a list of virtual machines that do not contain a specific software technology (including, for example, a kernel V-driver according to the present invention) can be developed. Since a hypervisor contains information on the location of each "at rest" virtual machine (i.e., the flat file of a virtual machine that is not being executed), the list of virtual machines that do not contain a kernel V-driver can be used to query hypervisor API 1015 or kernel V-driver 1025 in hypervisor kernel 1020 to locate where physically those virtual machines reside when they are "at rest." It will thus be possible to identify, locate, and insert a kernel level device driver into a virtual machine file that is resident on a physical machine or on a local disk, storage area network, or network attached storage associated with a particular hypervisor.

The insertion of a kernel driver into a flat file that (when executed) is considered a virtual machine may be accomplished by parsing though the "at rest" flat file of the virtual machine and identifying the bit location of other known drivers (e.g., printer drivers, communications drivers, and other similar drivers) Once a specific known driver is location, various methods could be used to insert the kernel driver into the virtual machine flat file.

In an embodiment, virtual machine flat file 1060 can be parsed for known drivers and once located a known driver can be replaced with a kernel driver (such as V-driver Kernel Driver 1075 shown in FIG. 10) that mimics the same functionality as the original driver by compressing both the original driver, the V-driver and a compression engine into the same size memory space as the original uncompressed driver.

In an alternate embodiment, virtual machine flat file 1070 can be parsed for known drivers as described above. The known driver can be replaced with V-driver kernel driver 1080 that will facilitate the functions of the known driver by encapsulating the known driver with an application wrapper that can then utilize V-driver kernel driver 1080 to execute the encapsulated known driver from application space while providing it a kernel interface. The V-driver will assume the location and connection of the "known driver" and move the "known driver" into application space, setting up a conduit to interface the "known driver" back into the kernel.

In yet another embodiment, the virtual machine can be executed in temporary, contained memory (also known as a "sandbox") and the V-driver Kernel Driver can be inserted at run-time, with no user interaction. The insertion is accomplished by utilizing the exposed interfaces at run-time. By loading the Virtual Machine in a separate virtual player instance for the purposes running a driver insertion script against the file, the virtual machine will temporarily be executed by the virtual player instance and then, inserted with the driver and terminated, without user interaction. This process will be performed as a batch process against virtual machines that do not contain the V-driver automatically at the user's option.

CONCLUSION

A communication network can contain both trusted peers and untrusted hosts within the network. Utilizing the systems and methods described above, trusted peers can collaborate with each other and with an administration console using collaboration modules. A trusted peer can observe and monitor the activity of other trusted peers, untrusted hosts, along with activity within the computing system of that trusted peer itself. In addition, a trusted peer instantiated with a virtual machine can have an operating system kernel collaborate with a hypervisor to determine whether threats are present. A trusted peer that needs particular functionality installed can collaborate with other trusted peers and with an administrative console to have that functionality installed. Further, an untrusted host can have a driver directly inserted into it by an administration console, which will facilitate in the collaboration process.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for inserting a driver into a virtual machine comprising:
   parsing, by a computer system, a virtual machine file on a storage device for a known bit pattern;
   determining, by the computer system, based on the known bit pattern, a location in which to insert an executable segment;
   inserting, by the computer system, the executable segment into the virtual machine file on the storage device using the determined location; and
   verifying, by the computer system, that the insertion completed successfully.

2. The method of claim 1 wherein the known bit pattern is a first driver.

3. The method of claim 2, wherein the first driver is one of a printer driver, communications driver, or video driver.

4. The method of claim 1 wherein the executable segment is a second driver.

5. The method of claim 3, wherein the second driver is a kernel driver.

6. The method of claim 1, wherein inserting the executable segment further comprises compressing the known bit pattern, the executable segment, and a compression engine into a memory space equivalent in size to the known bit pattern.

7. The method of claim 1, wherein inserting the executable segment further comprises:
   replacing the known bit pattern in the virtual machine file with the executable segment;
   encapsulating the known bit pattern with an application wrapper; and
   utilizing the executable segment as a conduit to allow the known bit pattern to execute.

8. The method of claim 1, wherein inserting the executable segment further comprises:
   executing the virtual machine in temporary memory;executing a driver insertion script; and
   inserting the executable segment into the executing virtual machine.

9. A system for inserting a driver into a virtual machine comprising:
   a storage device to store a virtual machine file; and
   a processing device, coupled to the storage device, to:
   parse the virtual machine file for a known bit pattern;
   determine, based on the known bit pattern, a location in which to insert an executable segment;
   insert the executable segment into the virtual machine file using the determined location; and
   verify that the insertion completed successfully.

10. The system of claim 9 wherein the known bit pattern is a first driver.

11. The system of claim 10, wherein the first driver is one of a printer driver, communications driver, or video driver.

12. The system of claim 9 wherein the executable segment is a second driver.

13. The system of claim 12, wherein the second driver is a kernel driver.

14. The system of claim 9, wherein the processor is further to compress the known bit pattern, the executable segment, and a compression engine into a memory space equivalent in size to the known bit pattern.

15. The system of claim 9, the processor is further to:
    replace the known bit pattern in the virtual machine file with the executable segment;
    encapsulate the known bit pattern with an application wrapper; and
    utilize the executable segment as a conduit to allow the known bit pattern to execute.

16. The system of claim 9, the processor is further to:
    execute the virtual machine in temporary memory;
    execute a driver insertion script; and
    insert the executable segment into the executing virtual machine.

17. A non-transitory computer-readable storage medium containing data and instructions to cause a processor to perform a method for inserting a driver into a virtual machine comprising:
    parsing, by a computer system, a virtual machine file on a storage device for a known bit pattern;
    determining, by the computer system, based on the known bit pattern, a location in which to insert an executable segment;
    inserting, by the computer system, the executable segment into the virtual machine file on the storage device using the determined location; and
    verifying, by the computer system, that the insertion completed successfully.

18. The non-transitory computer-readable storage medium of claim 17 wherein the known bit pattern is a first driver.

19. The non-transitory computer-readable storage medium of claim 18 wherein the first driver is one of a printer driver, communications driver, or video driver.

20. The non-transitory computer-readable storage medium of claim 17 wherein the executable segment is a second driver.

21. The non-transitory computer-readable storage medium of claim 20 wherein the second driver is a kernel driver.

22. The non-transitory computer-readable storage medium of claim 17, wherein inserting the executable segment further comprises compressing the known bit pattern, the executable segment, and a compression engine into a memory space equivalent in size to the known bit pattern.

23. The non-transitory computer-readable storage medium of claim 17, wherein inserting the executable segment further comprises:
    replacing the known bit pattern in the virtual machine file with the executable segment;
    encapsulating the known bit pattern with an application wrapper; and
    utilizing the executable segment as a conduit to allow the known bit pattern to execute.

24. The non-transitory computer-readable storage medium of claim 17, wherein inserting the executable segment further comprises:
    executing the virtual machine in temporary memory;executing a driver insertion script; and
    inserting the executable segment into the executing virtual machine.

* * * * *